United States Patent [19]
Strobel et al.

[11] Patent Number: 5,575,099
[45] Date of Patent: Nov. 19, 1996

[54] METHOD AND APPARATUS FOR PRODUCING SIGNS WITH PRISMATIC LETTERS AND GRAPHIC IMAGES

[75] Inventors: Wolfgang M. Strobel; Barrett C. Gray, both of Tolland, Conn.; Sanjay V. Sohoni, Longmeadow, Mass.

[73] Assignee: Gerber Scientific Products, Inc., Manchester, Conn.

[21] Appl. No.: 434,388

[22] Filed: May 3, 1995

[51] Int. Cl.$^6$ .............................. B27B 1/00; G09F 7/00; B23C 1/16
[52] U.S. Cl. .................. 40/584; 40/596; 144/2.1; 144/356; 144/391; 144/393; 144/400; 144/134.1; 364/474.02; 364/474.05; 364/474.24; 409/79; 409/80; 409/191; 409/84
[58] Field of Search ............................ 40/584, 596, 618, 40/622; 144/2.1, 356, 391, 393, 400, 134.1; 451/123, 919, 411; 409/79, 80, 84, 131, 132, 137, 184, 204, 191, 96; 428/17, 106, 156, 528; 364/474.02, 474.05, 474.22, 474.23, 474.35

[56] References Cited

U.S. PATENT DOCUMENTS

| Re. 25,930 | 12/1965 | Agnew | 156/58 |
|---|---|---|---|
| 3,213,757 | 10/1965 | Cardwell, Jr. | 409/84 |
| 3,635,124 | 1/1972 | Parsons | 409/137 |
| 3,650,178 | 3/1972 | Appleton | 409/80 |
| 3,690,200 | 9/1972 | Weaver | 82/14 A |
| 3,843,875 | 10/1974 | Goodstal et al. | |
| 3,857,025 | 12/1974 | English et al. | 235/151.11 |
| 3,915,061 | 10/1975 | Stockman | 409/84 |
| 3,964,367 | 6/1976 | Stöferle et al. | 409/131 |
| 3,968,728 | 7/1976 | Goldfarb et al. | 409/84 |
| 4,025,764 | 5/1977 | Tack | 235/151.11 |
| 4,096,770 | 6/1978 | Tanner | 82/1 |
| 4,173,786 | 11/1979 | Kuhnell et al. | 364/475 |
| 4,455,113 | 6/1984 | Liebman | 40/596 X |
| 4,596,501 | 6/1986 | Wu | 409/131 |
| 4,624,609 | 11/1986 | Pickett | 409/96 |
| 4,878,524 | 11/1989 | Rosenthal et al. | 144/356 |
| 5,008,806 | 4/1991 | Seki et al. | 364/191 |
| 5,033,005 | 7/1991 | Haske | 365/474.29 |
| 5,144,871 | 9/1992 | Niwa | 82/1.11 |
| 5,151,864 | 9/1992 | Seki et al. | 364/474.23 |
| 5,197,013 | 3/1993 | Dundorf | 364/474.24 |
| 5,246,319 | 9/1993 | Prince et al. | 409/80 |
| 5,424,845 | 6/1995 | Holowko et al. | 364/474.35 X |
| 5,454,422 | 10/1995 | Kitagawa | 409/80 |

*Primary Examiner*—W. Donald Bray
*Attorney, Agent, or Firm*—McCormick, Paulding & Huber

[57] ABSTRACT

A method is disclosed for producing signs having raised, prismatic graphic images such as letters, numbers and other graphic images. Initial values for the graphic images are provided, and includes information defining an initial graphic representation for the graphic images, and may also include a return, which is the measure of distance by which the graphic images are raised relative to a background of a sign. A cutting tool is provided and has a radius and a cutting angle. One tool path is determined using the initial graphic representation. Tool passes and depths for the other passes are determined using the initial graphic representation, the cutting angle, and a distance which is not greater than the tool radius. A controller generates signals indicative of the tool paths and respective depths, and presents the signals to operate an automatic cutting machine and cutting tool to selectively remove material from a sheet material to produce the graphic images.

20 Claims, 4 Drawing Sheets

METHOD AND APPARATUS FOR PRODUCING SIGNS WITH PRISMATIC LETTERS AND GRAPHIC IMAGES

TECHNICAL FIELD

The present invention relates generally to signs and sign making, and relates more specifically to the production of signs having raised graphic images, such as letters and symbols, using multiple, two-dimensional, passes with a cutting tool to produce the graphic images.

BACKGROUND OF THE INVENTION

Signs are well known for purposes such as conveying information or for aesthetics, or some combination of each, and are produced on a variety of media. Wooden signs are a particularly popular style, especially such signs that include raised letters, numbers or other graphic images. As used herein, the term "wood" is intended to include wood and other carvable products including but not limited to plastics, metals, and other suitable materials. The raised letters, numbers or other graphic images are defined by an initial graphic representation, which is commonly referred to by lay persons as a two-dimensional "outline," although those skilled in the art will recognize that the term "outline" has a different, distinct meaning in the art.

The raised letters, numbers or other graphic images, as viewed from a position in front of the sign, each have two beveled sides or "facets" located within the initial graphic representation. The facets abut along an edge to form an apex, typically along the center of the lettering. The letters, numbers or other graphic images may include a "return," which is a measure of the distance between the lowermost edge of the facets and adjacent background. Such letters, numbers and other graphic images are referred to generally as "prismatic lettering" or "convex lettering," since the letters, numbers or other graphic images have a generally prismatic, convex cross-section.

Wooden signs with raised lettering, including those with prismatic lettering, have been produced for many years by hand-carving the sign from a wooden block, thick wooden board, metal, plastic or other suitable material, referred to herein as "sheet material." Hand-carving a wooden sign requires an experienced craftsman, a number of different and expensive tools, and a large amount of time to produce a sign. For aesthetic reasons it is usually desirable that such a sign be produced from a single block or thick sheet of wood.

To produce a hand-carved sign, a craftsman selects a piece of sheet material, stencils a proposed design onto the sheet material, and removes sheet material from areas within the design to produce rough letters, numbers of graphic images on the sheet material. He or she then bevels the top surface of the rough letters to form the prismatic lettering.

It is difficult to repair the sign if too much material is removed. Since wooden blocks, thick sheets of wood and other suitable material are expensive, it is imperative to avoid mistakes which result in removing too much material. Accordingly, the craftsman must proceed in a deliberate manner, which adds to the labor-intensive nature of hand-carved signs. It can take several days to produce a nominally-sized hand-carved sign, e.g., 3 feet by 4 feet. In addition, it is difficult to have a hand carved sign made, as only a few experienced craftspersons remain. As a result, hand-carved signs are expensive, and are prohibitively expensive for most applications. Larger and/or more intricate signs require even more time to produce, and are correspondingly more expensive.

A proposed solution to hand-carving signs is to produce the signs using a computer-controlled cutting machine that moves a cutting tool in a tool path of three or more dimensions, i.e., in X, Y and Z coordinate directions in a single pass. A typical cutting tool has one or more cutting faces arranged about an axis of rotation to selectively remove material from the sheet material when lowered into the material and moved in a tool path. Machines that are capable of operating in a three dimensional tool path are more expensive than machines that operate in only two or two and a half dimensions, but are becoming increasingly more common. The term "two dimensions" refers to the fact that a machine is capable of moving an associated cutting tool in only a two dimensional tool path at any given time, and is manually moved in the third dimension, i.e., indexed, in between tool paths. The term "two and a half dimensions" refers to the fact that a machine is capable of moving an associated cutting tool in only a two dimensional tool path at any given time, and is capable of automatically indexing the tool in between tool paths. Known cutting machines operating in three or more dimensions generate incised lettering, rather than prismatic lettering.

Machines capable of operating in a five dimensional tool path, the X, Y and Z axes, together with a capability for rotation about the axis of rotation of the cutting tool in two, additional directions, are extremely expensive, and there are relatively few such machines available. In contrast, machines that operate in three or fewer dimensions are substantially less expensive. Moreover, the number of computations that must be made to generate the information to operate the cutting head in five dimensions, and the corresponding time and memory needed to accommodate such computations, in order to generate corresponding tool paths is very substantial.

The width of the facets, and thus the size of the prismatic lettering that may be produced in a single pass, is limited by the radius of the cutting tool. While the limitation is of little concern for relatively small prismatic lettering, such a limitation has prohibited the application of automating the production of larger signs having prismatic lettering. This limitation is not solved simply by using a larger cutting tool for at least two reasons.

First, for cost reasons, it is desirable to use a smaller cutting tool. The cost of fabricating a cutting tool increases significantly with an increasing cutting tool radius. Thus, if a good-quality cutting tool with a one inch radius costs about $100, a cutting tool having a two-inches radius can cost several hundreds of dollars.

Second, for safety reasons, it is also desirable to use a smaller cutting tool. The cutting tools operate at speeds of over 20,000 revolutions per minute (rpm). Given the high rotational speeds, any imperfections in the cutting tool, such as a slight lack of balance, produce vibration that will, eventually and unpredictably, result in catastrophic failure of the cutting tool. Catastrophic failure in turn can result in serious damage to the cutting machine, and any other equipment or persons around the machine. Those skilled in the art will recognize that cutting tools with larger radii are more prone to vibration than smaller tools, and will produce more spectacular catastrophic failures than will tools of smaller radii. Part of the increased cost of a cutting tool having a larger radius results from the precision machining necessary to produce the cutting tool relatively free from imperfections such as lack of balance.

It is accordingly an object of the present invention to provide a method of producing signs having prismatic lettering that overcomes the drawbacks and disadvantages of prior art methods for producing signs having prismatic lettering.

SUMMARY OF THE INVENTION

The present invention relates to signs having prismatic graphic images such as letters, numbers and/or other graphic images that are produced by removing material from a sheet material using an automated cutting machine.

According to one aspect of the present invention, a method is provided for producing prismatic graphic images in sheet material of a predetermined thickness using an automated cutting machine that is responsive to tool path signals and has a rotary cutting tool for removing material from the sheet material, the cutting tool has an axis of rotation, a radius extending from the axis to an outer edge of the tool, a cutting surface and a cutting angle defined by the cutting surface and a plane normal to the axis, the graphic images have a preselected, two-dimensional initial graphic representation, and the method comprises the steps of: generating signals indicative of an initial graphic representation of the graphic images to be produced in the sheet material in accordance with the graphic images generating program, the initial graphic representation being defined by a predetermined data set; determining a maximum stroke width of the graphic images in accordance with the initial graphic representation and generating signals indicative of the maximum stroke width; determining tool paths in accordance with the signals indicative of the initial graphic representation, the signals indicative of the maximum stroke width, and the signals indicative of the tool radius and cutting angle, the tool paths being oriented generally normal to the axis of rotation, and generating signals indicative of the tool paths; and presenting the signals indicative of the tool paths to the automated cutting machine.

According to another aspect of the present invention, an article is disclosed comprising a sign with prismatic graphic images produced in sheet material of a predetermined thickness using a cutting machine that is responsive to tool path signals and has a rotary cutting tool for removing material from the sheet material, the cutting tool having an axis of rotation, a radius as measured normal to the axis to an edge of the tool, a cutting surface and a cutting angle defined by the cutting surface and a plane normal to the axis, the graphic images having a preselected, two-dimensional initial graphic representation, and the article is produced in accordance with a method comprising the steps of: generating signals indicative of an initial graphic representation of the graphic images to be produced in the sheet material in accordance with the graphic images generating program, the initial graphic representation being defined by a predetermined data set; determining a maximum stroke width of the graphic images in accordance with the initial graphic representation and generating signals indicative of the maximum stroke width; determining tool paths in accordance with the signals indicative of the initial graphic representation, the signals indicative of the maximum stroke width, and the signals indicative of the tool radius and cutting angle, the tool paths being oriented generally normal to the axis of rotation, and generating signals indicative of the two-dimensional tool paths; and presenting the signals indicative of the tool paths to the automated cutting machine.

According to yet another aspect of the present invention, an apparatus is disclosed for controlling an automated cutting machine for producing prismatic graphic images in sheet material having a predetermined thickness. The automated cutting machine is responsive to tool path signals and has a rotary cutting tool for removing material from the sheet material. The cutting tool has an axis of rotation, a radius extending from the axis to an outer edge of the tool, a cutting surface and a cutting angle defined by the cutting surface and a plane normal to the axis. The graphic images having a preselected, two-dimensional initial graphic representation.

The apparatus includes a first signal generator for generating signals indicative of an initial graphic representation of the graphic images to be produced in the sheet material in accordance with the graphic images generating program. The apparatus also includes a first mechanism for determining a maximum stroke width of the graphic images in accordance with the initial graphic representation and for generating signals indicative of the maximum stroke width.

A second mechanism of the apparatus is provided for determining tool paths in accordance with the signals indicative of the initial graphic representation, the signal indicative of the maximum stroke width, and the signals indicative of the tool radius and cutting angle, the tool paths being oriented substantially normal to the axis of rotation, and for generating signals indicative of the tool paths. The apparatus also includes a signal presenter for presenting the signals indicative of the tool paths to the automated cutting machine.

One advantage of the present invention is that only a two-dimensional initial graphic representation or model is required to produce the prismatic lettering, rather than the three dimensional model as required using known methods, including those methods which require the use of a three dimensional cutting machine. A substantial time and cost savings is realized, as the making of a two-dimensional initial graphic representation requires far less time, effort and associated cost to prepare than does the three-dimensional model.

Another advantage of the present invention is that since two-dimensional tool paths are preferably employed, the invention only requires a cutting machine capable of operating in two or two and a half dimensions to produce such signs, and such machines are substantially less expensive than machines which operate in five dimensions. Of course, the present invention can be used with a machine capable of operating in more than two and a half dimensions. In contrast to hand-carving, which is a labor-intensive activity, producing signs using automated cutting machines is relatively capital-intensive, although there is "labor" involved in programming the machine. As noted above, machines that operate in two or in two and a half dimensions are less expensive, and correspondingly less expensive to purchase, lease or otherwise use in the production of signs than, for example machines that operate in five dimensions. Accordingly, the expense associated with purchasing, leasing or otherwise using automated machines to produce such signs are substantially reduced.

Another advantage of the present invention is that smaller cutters can be used to produce signs that include large, prismatic lettering. Accordingly, the safety issues, and cost considerations, associated with prior methods utilizing large cutters are substantially avoided.

Other advantages of the present invention will become apparent in view of the following detailed description and attached claims.

DETAILED DESCRIPTION OF THE PREFERRED EMBODIMENTS

Figure 1:
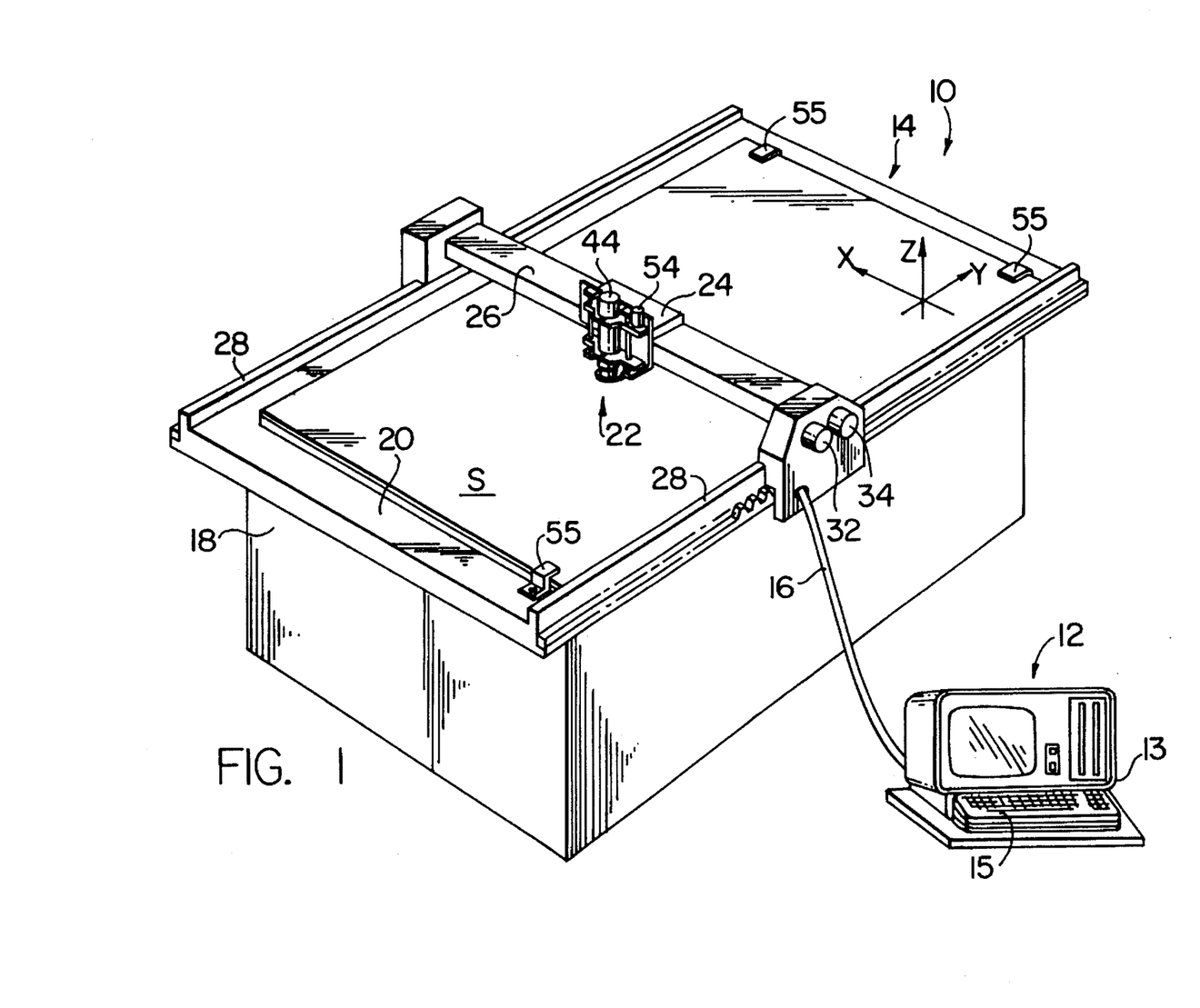
FIG. 1 is a schematic, perspective view of a cutting machine in accordance with the present invention.

Turning now to FIG. 1, a device 10 is shown for producing signs with prismatic lettering in accordance with the present invention. The device 10 includes a controller 12 having a computer, and an automatically controlled cutting machine 14 for removing material from a sheet material S and for producing graphic images such as letters, numbers and other graphic images, referred to collectively as graphic images, in the sheet material in accordance with signals indicative of tool paths. The sheet material may be a wooden block or thick sheet of wood, plastic, or other similar material for use as a sign. While illustrated as a single unit, those skilled in the art will recognize that the computer and controller may be physically separate units. The computer is used for generating tools paths and corresponding signals indicative of the tool paths, while the controller uses the signals to operate the cutting machine.

The controller 12 and automatic cutting machine 14 are electrically coupled by a cable 16 or other suitable means for carrying signals between the controller and cutting machine. In the illustrated embodiment, the automatic cutting machine is manufactured by the assignee of the present invention, such as those machines marketed as the model "Advantage Router 600™TM" or "Dimension 200®." The controller 12 receives signals indicative of initial values for the graphic images, including information in X- and Y-coordinate directions of an initial graphic representation for the graphic images, from an input source such as a diskette, tape or other computer, and generates signals indicative of the X-Y initial graphic representation coordinates which are used to control the operation of the cutting machine 14, as further described below. The information may be in the form of coordinates, points and vectors or other suitable form, and those skilled in the art will recognize that the actual information for the initial graphic representation depends upon the graphic image to be produced. The controller 12 has a keyboard 15 which is used to input information relating to the production of signs, as is also further described below.

The cutting machine 14 includes a cutting table 18 having a bed 20 for supporting the sheet material S, and a cutting head 22 which is translated in a cutting relationship over the sheet material. A pair of head supporting carriages 24, 26 are mounted above the bed 20 for translating the head 22 back and forth over the support surface defined by the bed 20 in the illustrated X-Y coordinate directions. One carriage 26 is the Y carriage, and is supported at the lateral sides of the table 18 on a pair of rails or ways 28 extending parallel to the Y coordinate direction. Suitable drive linkages, such as toothed belts (not shown) are positioned adjacent to the ways 28, and are engaged by drive pulleys (not shown) which are rotatably mounted to the Y carriage 26. Each of the drive pulleys are coupled to a Y drive motor 32, and driven in response to command signals from the controller 12.

The X carriage 24 is supported on the Y carriage 26 and is movable along the Y carriage and relative to the bed 20 in the illustrated X carriage direction. A lead screw (not shown) or other suitable drive linkage engages the X carriage 24 and is rotatably driven by an X motor 34 in response to signals generated by and received from the controller 12. Composite motion of the X and Y carriages 24, 26 moves the head 22 and an associated cutting tool over the surface of the bed 20 along a desired cutting path parallel to the plane defined by the X-Y coordinate directions. to selectively remove material from the sheet material S. Alternate means for translating the carriages, such as cable and pulley systems, pulleys/pinions, lead screws or ball screws, may be employed with equal effect.

Figure 2:
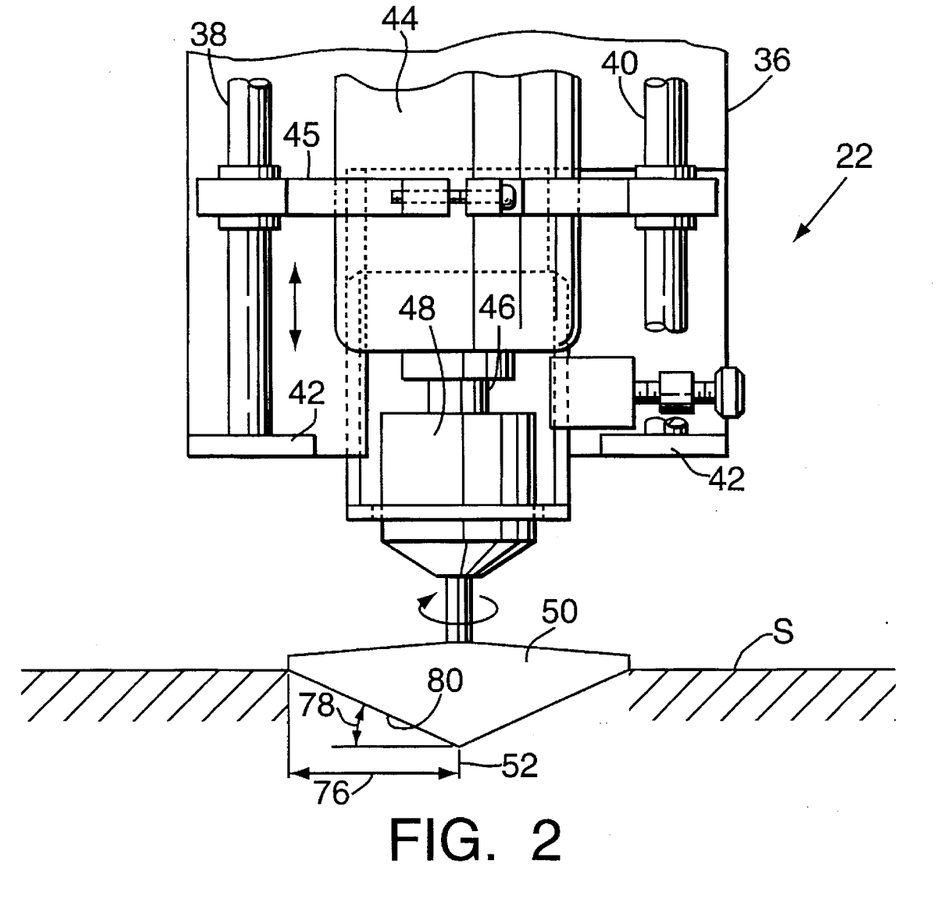
FIG. 2 is a schematic view of the cutting head and cutting tool of the machine of FIG. 1.

Referring now to FIG. 2, the cutting head 22 is shown in more detail, and includes a tool mounting plate 36 supported by the Y carriage 24 with bolts (not shown) or other suitable means. A pair of slide rods 38, 40 are secured in a spaced relationship relative to the mounting plate 36 by upper (not shown) and lower 42 extending flanges attached to the mounting plate. A cutting tool drive motor 44 having a drive shaft 46 is, in turn, supported by the slide rods 38, 40 through the upper and lower 42 flanges, which are clamped to the drive motor as illustrated and slide up and down the rods. In this manner, the motor 44 is moveable substantially in a vertical, or Z coordinate, direction. A chuck 48 is fixed to one end of the drive shaft 46, and in turn couples a cutting tool 50 with the drive shaft, such that the motor rotates the shaft, chuck and the tool about a common axis of rotation 52.

A vertical positioning motor 54 (FIG. 1) is also fixed to the mounting plate 36, to control the upward and downward movement and vertical position of the cutting tool drive motor 44, and thus of the cutting tool 50 coupled to the motor 44. The positioning motor 54 drives a lead screw (not shown), or other suitable drive linkage, that is oriented parallel to the Z coordinate direction and is supported on the mounting plate 36. The lead screw engages a threaded opening formed in a laterally extending portion of the upper bracket that is coupled to an upper portion of the positioning motor 54. Thus, the rotation of the vertical positioning motor 54 in one direction or the other controls the upward and downward movement of the chuck 48, and in turn the penetration depth of the cutting tool 50 in the sheet material S. The vertical positioning motor 54 is also controlled by signals received from the controller 12.

Figure 3A:
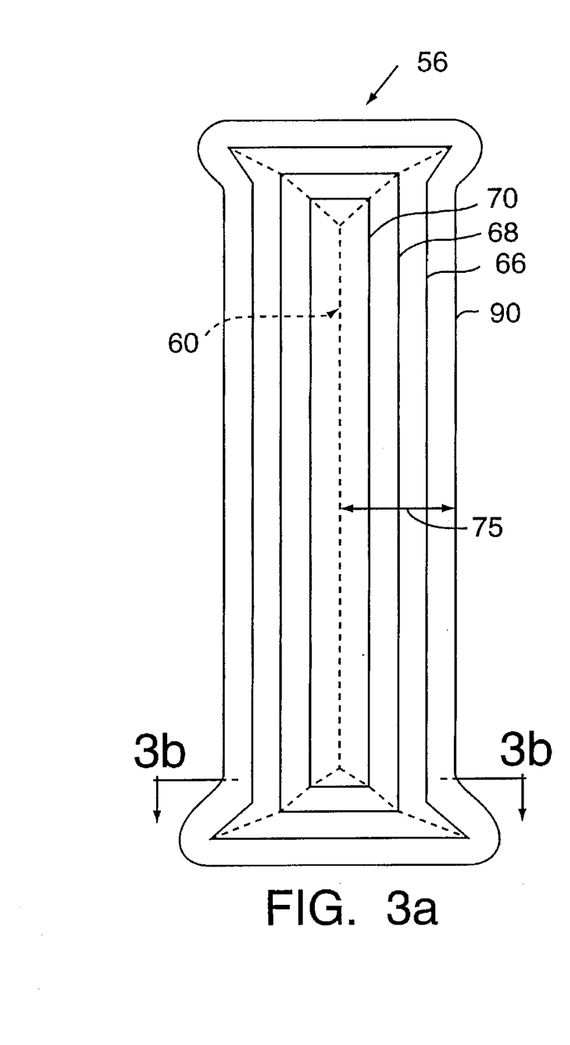
FIG. 3a is a schematic, top view of an upper case letter "T" produced using the machine of FIGS. 1 and 2 in accordance with the present invention, illustrating the initial graphic representation of the letter and the tool paths followed to produce the letter.
Figure 3B:
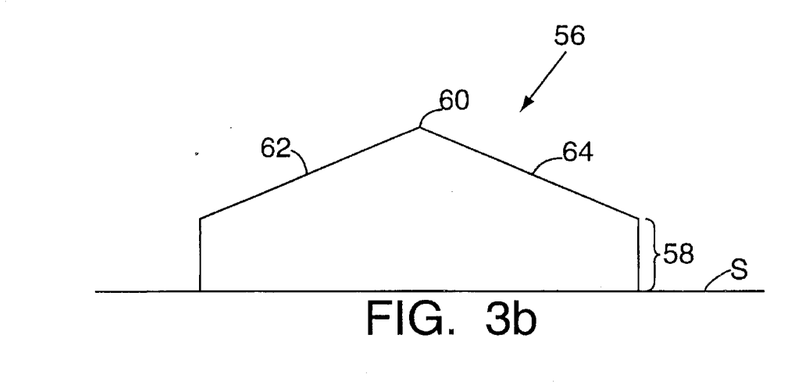
FIGS. 3b is a side view in cross-section of the letter of FIG. 3a, taken along the lines 3b–3b, illustrating the depths of several tool paths.
Figure 3C:
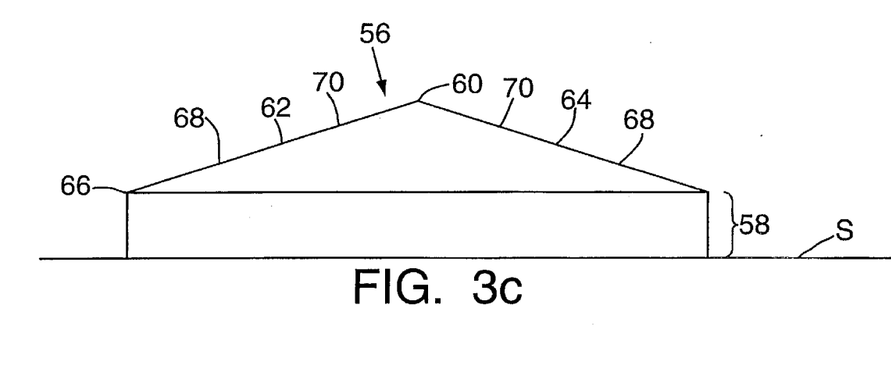
FIG. 3c is another side view of the letter of FIG. 3a, but illustrating the bottom end of the letter.

As shown in FIG. 1, the sheet material S is releasably held on the bed 20 of the cutting machine by variable position clamps 55, 55, but may alternatively be held by vacuum hold downs (not shown) such as are marketed by the assignee of the present invention, or other suitable means. With reference to FIGS. 3a, 3b and 3c, a letter "T" produced in sheet material in accordance with the present invention is indicated generally by the reference numeral 56. The letter 56 may include a return 58, and includes an apex 60 that extends along the letter. The return 58 is a measure of the distance from the lowermost edge of the facets 62, 64 and a background of the sheet material S, and is essentially a "step" at which lower edges of the facets terminate. If provided, the return 58 is preferably constant around the letter, and may be user-selected and input via the keyboard of the controller 12. The letter 56 is a prismatic letter, and thus includes two beveled sides 62, 64 that generally define facets and abut along the apex 60. The angle of the facets relative to the sheet material S is defined by the angle, described further below, of the cutting tool 50.

The tool paths to be followed by the cutting head and associated cutting tool for the letter 56 are illustrated in FIG. 3a at 66, 68 and 70, and the determination of these tool paths is described below with respect to FIG. 4. As is also discussed below, the particular tool paths for a given graphic image will differ depending upon the size and style of the graphic image, as well as any return, and also upon the cutting angle and radius of the tool 50.

Figure 4:
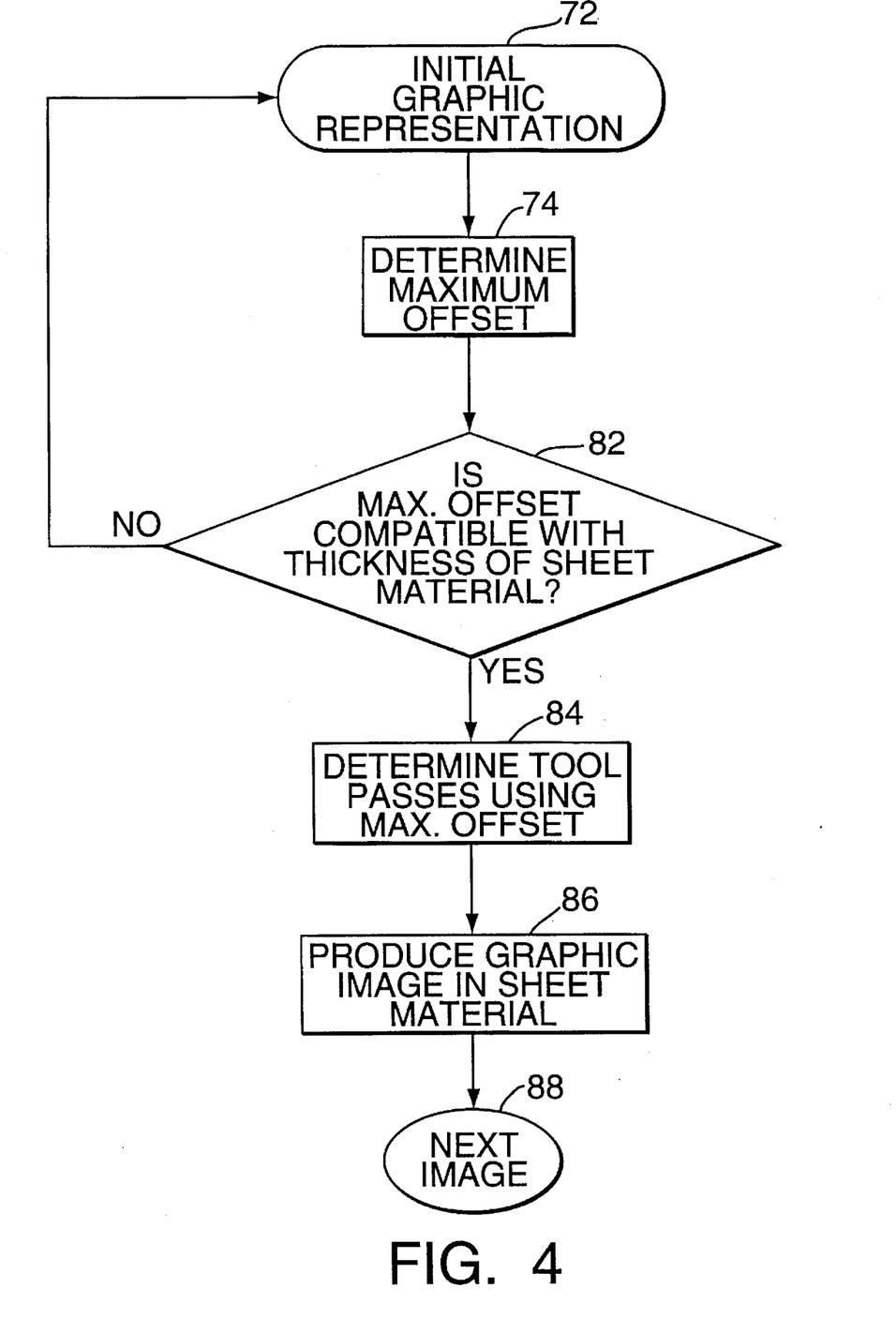
FIG. 4 is a flow diagram showing the steps of a graphic images generating images program employed in the present invention.

With respect to FIG. 4, the preferred method of the present invention is described, and initially includes a selection of the graphic image to be produced. The selection may be made, for example, by the operator through the keyboard 15 or via a graphic image generating program. For purposes of the example, it is assumed that the letter "I" is selected for production.

If not already entered, the initial values for the graphic image are then input (block 72) to the computer 13 of the controller 12. The initial values include a predetermined set of coordinates, or other suitable information such as a set of points and vectors, that define a two-dimensional initial graphic representation of the image, the cutting tool 50 radius and cutting angle, and the desired return 58 for the image. The coordinates of the initial graphic representation of the letter "I" are input into the controller 12, for example after being read from a memory storage device, or a graphic images generating program, and depend upon the style and size of the image as well as the position of the image on the sheet material. The desired return 58 is also input, preferably via the keyboard of the controller 12, and a corresponding signal is presented to the controller.

Prior to determining any tool paths, the maximum offset (FIG. 3a at 75) that may be used with the initial graphic representation is determined (block 74). Those skilled in the art will recognize that the maximum offset will be negative, and corresponds to an in-line (as opposed to an outline) that is positioned within and spaced from the initial graphic representation. As is further described below, the maximum stroke width is determined by generating in-lines from the initial graphic representation. Those skilled in the art will recognize that the maximum offset may also be determined, for example, by fitting circles within the initial graphic representation, in which case the radius of the largest circle that fits within the initial graphic representation corresponds to the maximum offset.

To determine the maximum offset, an initial offset is selected that is large enough to ensure an unacceptable condition. That is, the initially selected offset should be selected which results in an in-line that does not fit within the initial graphic representation. For example, if the graphic image is roughly 18" by 12" the initial offset might be 15". When evaluated by software such as the "Graphix Advantage®" which is produced and sold by the assignee of the present invention, this will result in a "failure" condition.

From an offset that results in a "failure" condition, a subsequent offset is selected that is some fraction, for example one-half, of the previous offset. A signal indicative of the subsequent offset is generated, and is then evaluated to determine whether the subsequent offset fits within the initial graphic representation, and thus results in a "success" condition. If the failure condition again results, then subsequent, smaller offsets are selected and evaluated until a "success" condition results.

As will be recognized by those skilled in the art, a success condition indicates that the offset fits within the initial graphic representation, which in most cases means that a larger offset will result in an in-line that still fits within the initial graphic representation. Accordingly, a larger offset that resulted in the success condition must be determined. From an offset that results in a "success" condition, the next offset to be evaluated is some fraction larger than the previous, successful offset. Again, by way of example, the next offset is selected to be about halfway between the successful offset, and the most-recent offset that resulted in failure. As the steps of selecting and evaluating subsequent offsets are repeated, a value which will be the maximum offset, is converged upon. The steps are repeated until the difference in determined offsets between a previous offset and a next-computed offset is less than some preselected value, for example 0.001 inch. A signal indicative of the value of the maximum offset (OFFSET $_{max}$) is then generated, and is stored in a memory storage device, e.g., a RAM of the computer 13, for subsequent use.

For a given cutting tool 50, the maximum offset is used to determine whether the sheet material is of sufficient thickness to produce the prismatic graphic image (block 82). If the sheet material is too thin, then the graphic images cannot be fully formed in the sheet material. As shown in FIG. 2, the tool has a radius (R) 76, and a cutting angle 78 defined by a plane normal to the axis of rotation 52 and a cutting surface 80 of the tool. The minimum thickness (T) of the sheet material required to produce the graphic image can be expressed as:

$$T = (\text{OFFSET}_{max}) \cdot \tan(\alpha).$$

A signal indicative of the value of the minimum thickness T is generated and is compared, for example by a comparator (not shown separately) of the computer 13, to a signal indicative of the actual thickness of the sheet material, as is provided above via the keyboard of the controller 12, to determine whether the proposed graphic images are too big (thick) to fit within the sheet material S. The return 58, if any, must also be added to determine the minimum thickness.

If it is determined from the comparison that the minimum thickness T is at least equal to the sheet material thickness, then the graphic image is too deep for the sheet material. Accordingly, an error signal is generated by the controller 12. Given an error condition, one or more of the following must be performed: replacement of the cutting tool 50 with one having a smaller/shallower cutting angle 78, selection of a sheet material of a greater thickness or of a different graphic image having a smaller maximum offset, or some combination, after which the above described steps should be repeated to ensure compatibility of the sheet material, cutting tool and graphic images.

When the sheet material thickness, cutting tool and graphic image are compatible, the number of tool passes required to produce the graphic image is then determined (block 84) using the signal indicative of the maximum offset (OFFSET $_{max}$). While two-dimensional tool passes are described below, those skilled in the art will recognize that three dimensional passes may be generated, for example by varying the depth of a pass as the width of the graphic image changes. The required number of tool passes (N) is related to the maximum depth of the cutting tool as compared to the minimum thickness T to produce the graphic images, and can be expressed as:

$$\text{OFFSET}_{max} = N \cdot R \cdot \cos(\alpha).$$

If N is not equal to an integer, then N is rounded up to the next integer, and a corresponding signal is generated.

The computer 13 then determines the appropriate depth of each pass, and thus the change in depth per pass using signals indicative of the number of tool passes (N), the maximum offset (OFFSET $_{max}$), the tool radius (R) 76, and the cutting angle ($\alpha$) 78. While the change in depth between passes may differ, it is preferably constant. For example, if the minimum thickness T required to produce the graphic image is 2.1 inches and maximum depth per pass for the cutting tool is 0.4 inch, then 6 passes will be required to produce the graphic images. The change of depth ($d_{ch}$) for each pass will be 2.⅙ or about 0.35 inch. Those skilled in the art will recognize that the offset per pass can be determined from the change in depth per pass by the following expression:

$$d_{ch} = (\text{OFFSET}_{per\ pass}) \cdot \tan(\alpha).$$

From which: $(\text{OFFSET}_{per\ pass}) = d_{ch}/\tan(\alpha)$.

The tool path to be followed by the cutting tool 50, and more specifically by the axis of rotation 52, for each pass is then determined using the initial graphic representation, the OFFSET$_{per\ pass}$, and the change in depth per pass rich. Those skilled in the art will recognize that, for the purpose of determining the tool path for each pass, it makes little difference if tool paths are calculated from the apex down, or from the bottom of the graphic image up. For purposes of illustration, the tool paths are determined from the bottom of the graphic image towards the apex.

A first tool path, illustrated in FIG. 3a by the line 66, includes the initial graphic representation, coupled with a depth ($d_1$) as measured from the top of the sheet material, equal to the change in depth $d_{ch}$ times the number of tool passes N. The depth ($d_1$) of the first tool path may also be determined using the sheet material thickness and the return, if any. Signals corresponding to the first pass, including the depth of the first pass and the first tool path are generated and stored in the memory storage device of the computer 13 or other suitable location for subsequent use. As noted above, those skilled in the art will recognize that each pass and tool path can be expressed in various ways, such as by a coordinate set or by points and vectors.

A second tool path, represented in FIG. 3a by the line 68, is determined generating an in-line spaced from initial graphic representation by the OFFSET$_{per\ pass}$. The second tool path depth ($d_2$) is shallower, as measured from the top of the sheet material S, by an amount equal to the depth per pass ($d_{ch}$). Signals corresponding to the second pass, including the depth of the second pass and the second tool path, are generated and stored in the memory storage device of the computer 13 for subsequent use.

As needed, subsequent passes, including depths and tool paths are determined for N passes, and corresponding signals are generated and stored as described above. Alternatively, those skilled in the art will recognize that the depth and tool path for a subsequent pass may be determined from a previous pass rather than from the initial graphic representation. A V-cutter is used as the cutting tool 50 to produce the beveled sides 62, 64, and a portion of the beveled edges is formed each time the tool follows a tool path.

When all of the necessary tool paths have been determined and stored, these signals are presented to and received by the automatic cutting machine 14, which responds by moving the cutting tool laterally, and then vertically, in accordance with the generated signals to remove material from the sheet material by following the first, second and subsequent passes to produce (block 86) the image in the sheet material. Those skilled in the art will recognize that the passes are preferably executed from the top down, to minimize chipping and splintering of the sheet material. The top-down order is a more efficient use of the machine, and additionally results in less chipping in the sheet material, which may occur along the apex 60. Thus, the last pass that was determined will be the first one executed. In addition, it may be necessary to follow the deeper passes several times, while indexing the cutting tool after each time, to incrementally remove sheet material. The image is completed when the automatic cutting machine 14 completes the initial tool path, in accordance with the signals indicative of the X-Y coordinates of the initial path and of the return 58, which as noted above is the depth of the initial tool path 66. When the graphic image, the letter "I" 56, is completed, the process is repeated for the next graphic image (block 88). Those skilled in the art will recognize that tool paths for multiple characters, such as letters, numbers, and other graphic images may be determined prior to carving any portion of the sheet material S. Any background design is then formed, as desired.

An optional, final step in producing the image is to generate the return 58. The cutting tool 50 is typically replaced with a narrower, straight tool, which is lowered into the sheet material, and the cutting tool is moved along the tool path 90, to remove material outside of that path.

From the foregoing, a novel method for the production of signs having prismatic graphic images, such as letters and symbols, using multiple, two-dimensional passes with a cutting tool has been disclosed in some detail. However, as will be recognized by those skilled in the art, numerous modifications and substitutions can be made without departing from the spirit of the invention or the scope of the appended claims. For example, three dimensional tool paths may be determined by varying the depth of the cutting tool along a tool path in proportion to the width of the graphic image at any particular point. Accordingly, the present invention has been described in several preferred embodiments by way of illustration rather than by limitation.

What is claimed is:

1. A method of producing prismatic graphic images in sheet material having a predetermined thickness using an automated cutting machine being responsive to tool path signals and having a rotary cutting tool for removing material from the sheet material, the cutting tool having an axis of rotation, a radius extending from the axis to an outer edge of the tool, a cutting surface and a cutting angle defined by the cutting surface and a plane normal to the axis, the graphic images having a preselected, two-dimensional initial graphic representation, the method comprising the steps of:

generating signals indicative of an initial graphic representation of the graphic images to be produced in the sheet material in accordance with a graphic images generating program, the initial graphic representation being defined by a predetermined data set;

determining a maximum stroke width of the graphic images in accordance with the initial graphic representation and generating signals indicative of the maximum stroke width;

determining tool paths in accordance with the signals indicative of the initial graphic representation, the signals indicative of the maximum stroke width, and the signals indicative of the tool radius and cutting angle, the tool paths being oriented generally normal to the axis of rotation, and generating signals indicative of the tool paths; and presenting the signals indicative of the tool paths to the automated cutting machine.

2. A method as described in claim 1, further comprising the step of:

removing material from the sheet material using the rotary cutting tool in accordance with the signals indicative of the tool paths to produce the graphic images in the sheet material.

3. A method as described in claim 1, further comprising the steps of:

determining a minimum depth of the graphic image in accordance with the signal indicative of the maximum stroke width, and the signals indicative of the tool radius and cutting angle, and generating a signal indicative of the minimum depth;

inputting a signal indicative of the predetermined thickness of the sheet material; and comparing the signal indicative of the minimum depth and the signal indicative of the predetermined thickness.

4. A method as described in claim 3, further comprising the step of:

indicating an error condition if it is determined during the step of comparing that the minimum depth of the graphic image is equal to or greater than the predetermined thickness.

5. A method as described in claim 1, wherein the step of determining the maximum stroke width of the graphic images comprises the steps of:

determining an in-line of the graphic image in accordance with the initial graphic representation and a signal indicative of a predetermined, initial offset, and generating signals indicative of the in-line; and evaluating the signals indicative of the in-line in accordance with the signals indicative of the initial graphic representation to determine whether the offset is the maximum offset.

6. A method as described in claim 5, further comprising the steps of:

adjusting the offset to adjust the corresponding in-line if it is determined during the step of evaluating that the offset is not equal to the maximum offset for the initial graphic representation.

7. An article comprising a sign with prismatic graphic images in sheet material of a predetermined thickness using a cutting machine which is responsive to tool path signals and has a rotary cutting tool for removing material from the sheet material, the cutting tool having an axis of rotation, a radius as measured normal to the axis to an edge of the tool, a cutting surface and a cutting angle defined by the cutting surface and a plane normal to the axis, the graphic images having a preselected, two-dimensional initial graphic representation, the article produced in accordance with a method comprising the steps of:

generating signals indicative of an initial graphic representation of the graphic images to be produced in the sheet material in accordance with a graphic images generating program, the initial graphic representation being defined by a predetermined data set;

determining a maximum stroke width of the graphic images in accordance with the initial graphic representation and generating signals indicative of the maximum stroke width;

determining tool paths in accordance with the signals indicative of the initial graphic representation, the signals indicative of the maximum stroke width, and the signals indicative of the tool radius and cutting angle, the tool paths being oriented generally normal to the axis of rotation, and generating signals indicative of the tool paths; and presenting the signals indicative of the tool paths to the automated cutting machine.

8. An article made in accordance with the method of claim 7, further comprising the step of:

removing material from the sheet material using the rotary cutting tool in accordance with the signals indicative of the tool paths to produce the graphic images in the sheet material.

9. An article made in accordance with the method of claim 7, further comprising the step of:

determining a minimum depth of the graphic image in accordance with the signal indicative of the maximum stroke width, and the signals indicative of the tool radius and cutting angle, and generating a signal indicative of the minimum depth;

inputting a signal indicative of the predetermined thickness of the sheet material; and comparing the signal indicative of the minimum depth and the signal indicative of the predetermined thickness.

10. An article made in accordance with the method of claim 9, further comprising the step of:

indicating an error condition if it is determined during the step of comparing that the minimum depth of the graphic image is equal to or greater than the predetermined thickness.

11. An article made in accordance with the method of claim 7, wherein the step of determining the maximum stroke width of the graphic images comprises the steps of:

determining an in-line of the graphic image in accordance with the initial graphic representation and a signal indicative of a predetermined, initial offset, and generating signals indicative of the in-line; and evaluating the signals indicative of the in-line in accordance with the signals indicative of the initial graphic representation to determine whether the offset is the maximum offset.

12. An article made in accordance with the method of claim 11, further comprising the step of:

adjusting the offset to adjust the corresponding in-line if it is determined during the step of evaluating that the offset is not equal to the maximum offset for the initial graphic representation.

13. An apparatus for controlling an automated cutting machine for producing prismatic graphic images in sheet material having a predetermined thickness, the automated cutting machine being responsive to tool path signals and having a rotary cutting tool for removing material from the sheet material, the cutting tool having an axis of rotation, a radius extending from the axis to an outer edge of the tool, a cutting surface and a cutting angle defined by the cutting surface and a plane normal to the axis, the graphic images having a preselected, two-dimensional initial graphic representation, the apparatus comprising:

means for generating signals indicative of an initial graphic representation of the graphic images to be produced in the sheet material in accordance with a graphic images generating program, the initial graphic representation being defined by a predetermined data set;

means for determining a maximum stroke width of the graphic images in accordance with the initial graphic representation and for generating signals indicative of the maximum stroke width;

means for determining tool paths in accordance with the signals indicative of the initial graphic representation, the signal indicative of the maximum stroke width, and the signals indicative of the tool radius and cutting angle, the tool paths being oriented substantially normal to the axis of rotation, and for generating signals indicative of the tool paths; and means for presenting the signals indicative of the tool paths to the automated cutting machine.

14. An apparatus as described in claim 13, further comprising:

means for determining a minimum depth of the graphic image in accordance with the signal indicative of the maximum stroke width and the signals indicative of the tool radius and cutting angle, and for generating a signal indicative of the minimum depth;

means for inputting a signal indicative of the predetermined thickness,, of the sheet material; and a comparator for comparing the signal indicative of the minimum depth and the signal indicative of the predetermined thickness.

15. An apparatus as described in claim 14, further comprising:

means for indicating an error condition the means for comparing determines that the minimum depth of the graphic image is equal to or greater than the predetermined thickness.

16. An apparatus as described in claim 13, wherein the means for determining the maximum stroke width of the graphic images determines in-lines for the graphic images in accordance with the initial graphic representation and a signal indicative of a predetermined, initial offset, and generates signals indicative of the in-lines, and evaluates the signals indicative of the in-lines in accordance with the signals indicative of the initial graphic representation to determine whether the offset is the maximum offset.

17. An apparatus as described in claim 16, wherein the means for determining the maximum stroke width of the graphic images adjusts the offset to produce an adjusted in-line if the means for evaluating determines that the offset is not equal to the maximum offset for the initial graphic representation.

18. A method as described in claim 1, wherein two dimensional tool paths are determined during the step of determining tool paths.

19. An article made in accordance with the method of claim 7, wherein two dimensional tool paths are determined during the step of determining tool paths.

20. An apparatus as described in claim 12, wherein the means for determining tool paths determines two dimensional tool paths.

* * * * *